US00RE48091E

(19) United States
(12) Reissued Patent
Njibaloh

(10) Patent Number: US RE48,091 E
(45) Date of Reissued Patent: Jul. 14, 2020

(54) INFANT OUTFIT

(71) Applicant: Ollia Njibaloh, Freeport, NY (US)

(72) Inventor: Ollia Njibaloh, Freeport, NY (US)

(21) Appl. No.: 29/676,882

(22) Filed: Jan. 15, 2019

Related U.S. Patent Documents

Reissue of:
(64) Patent No.: Des. 798,542
Issued: Oct. 3, 2017
Appl. No.: 29/573,106
Filed: Aug. 2, 2016

(51) LOC (12) Cl. ..... 02-02
(52) U.S. Cl.
USPC ..... D2/745
(58) Field of Classification Search
USPC ..... D2/717, 728, 733, 745, 749, 776, 802, D2/828, 840, 500; 2/76, 80, 90, 111
CPC ..... A41D 11/00; A41D 1/04
See application file for complete search history.

(56) References Cited

U.S. PATENT DOCUMENTS

D295,575 S * 5/1988 Campbell ..... 2/115
D347,933 S * 6/1994 Sessoms ..... D2/749
5,392,466 A * 2/1995 Chou ..... A41D 1/04 2/105
D438,365 S * 3/2001 Mattrasingh ..... D2/840
(Continued)

*Primary Examiner* — Philip S Hyder
(74) *Attorney, Agent, or Firm* — Scully, Scott, Murphy & Presser, P.C.

(57) CLAIM

I claim the ornamental design for an infant outfit, as shown and described.

DESCRIPTION

FIG. 1 is a perspective view of an infant outfit, showing a first embodiment of my new design with a collar of the design in a closed and upward configuration;
FIG. 2 is a perspective view thereof, illustrated with the collar in an open and downward position;
FIG. 3 is a front elevational view of FIG. 1, and with arms of the design in a straight configuration;
FIG. 4 is a rear elevational view of FIG. 1;
FIG. 5 is a left-side elevational view of FIG. 1;
FIG. 6 is a right-side elevational view of FIG. 1;
FIG. 7 is a top plan view of FIG. 1;
FIG. 8 is a bottom plan view of FIG. 1;
FIG. 9 is a perspective view of a second embodiment thereof, illustrated with the collar of the design in a closed and upward configuration;
FIG. 10 is a perspective view of the second embodiment, illustrated with the collar in the open and downward position;
FIG. 11 is a front elevational view of FIG. 9, and with arms of the design in the straight configuration;
FIG. 12 is a rear elevational view of FIG. 9; and
FIG. 13 is a left-side elevational view of FIG. 9.
FIG. 14 is a right-side elevational view of FIG. 9;
FIG. 15 is a top plan view of FIG. 9; and,
FIG. 16 is a bottom plan view of FIG. 9.
*The dashed broken lines of the fasteners and their accompanying fastener openings in FIGS. 1-3, 5-11, and 13-16 illustrate portions of the outfit that form no part of the claimed design.*
The broken lines showing an infant in FIGS. 1 and 9 depict environmental subject matter and form no part of the claimed design.
*The collar and trim of the attached figures appear in solid lines and are intended to illustrate the ornamental design of the fabric of these portions of the garment.*

1 Claim, 12 Drawing Sheets

Matter enclosed in heavy brackets [ ] appears in the original patent but forms no part of this reissue; matter printed in italics indicates the additions made by reissue.

(Amended)

(Amended)

(56) References Cited

U.S. PATENT DOCUMENTS

| | | | | | |
|---|---|---|---|---|---|
| 6,216,271 | B1 * | 4/2001 | Chen | A41D 13/1245 | 2/114 |
| D509,947 | S * | 9/2005 | Fortune | D2/840 | |
| D637,376 | S * | 5/2011 | Chapman | D2/745 | |
| D656,709 | S * | 4/2012 | Richards | D2/713 | |
| D689,259 | S * | 9/2013 | Marrin | D2/733 | |
| D692,209 | S * | 10/2013 | Dragu | D2/745 | |
| D710,571 | S * | 8/2014 | James | D2/745 | |
| D731,757 | S * | 6/2015 | Sullivan | D2/745 | |
| D731,758 | S * | 6/2015 | Sullivan | D2/745 | |
| D732,796 | S * | 6/2015 | Tuchardt | D2/745 | |
| D737,024 | S * | 8/2015 | Couto | D2/745 | |
| D741,046 | S * | 10/2015 | Pelekanou | D2/745 | |
| D742,097 | S * | 11/2015 | Dunn | D2/745 | |
| D743,145 | S * | 11/2015 | Tuchardt | D2/745 | |
| D744,722 | S * | 12/2015 | Sullivan | D2/745 | |
| D749,820 | S * | 2/2016 | Lombardo | D2/745 | |
| D767,251 | S * | 9/2016 | Couto | D2/714 | |
| D785,907 | S * | 5/2017 | Auth | D2/745 | |
| D798,542 | S | 10/2017 | Njibaloh | | |
| 2013/0298305 | A1 * | 11/2013 | Lushaj | A41D 11/00 | 2/80 |
| 2014/0123363 | A1 * | 5/2014 | Templeton | A41B 13/08 | 2/69 |
| 2014/0250558 | A1 * | 9/2014 | Russo | A41B 13/10 | 2/49.4 |

* cited by examiner

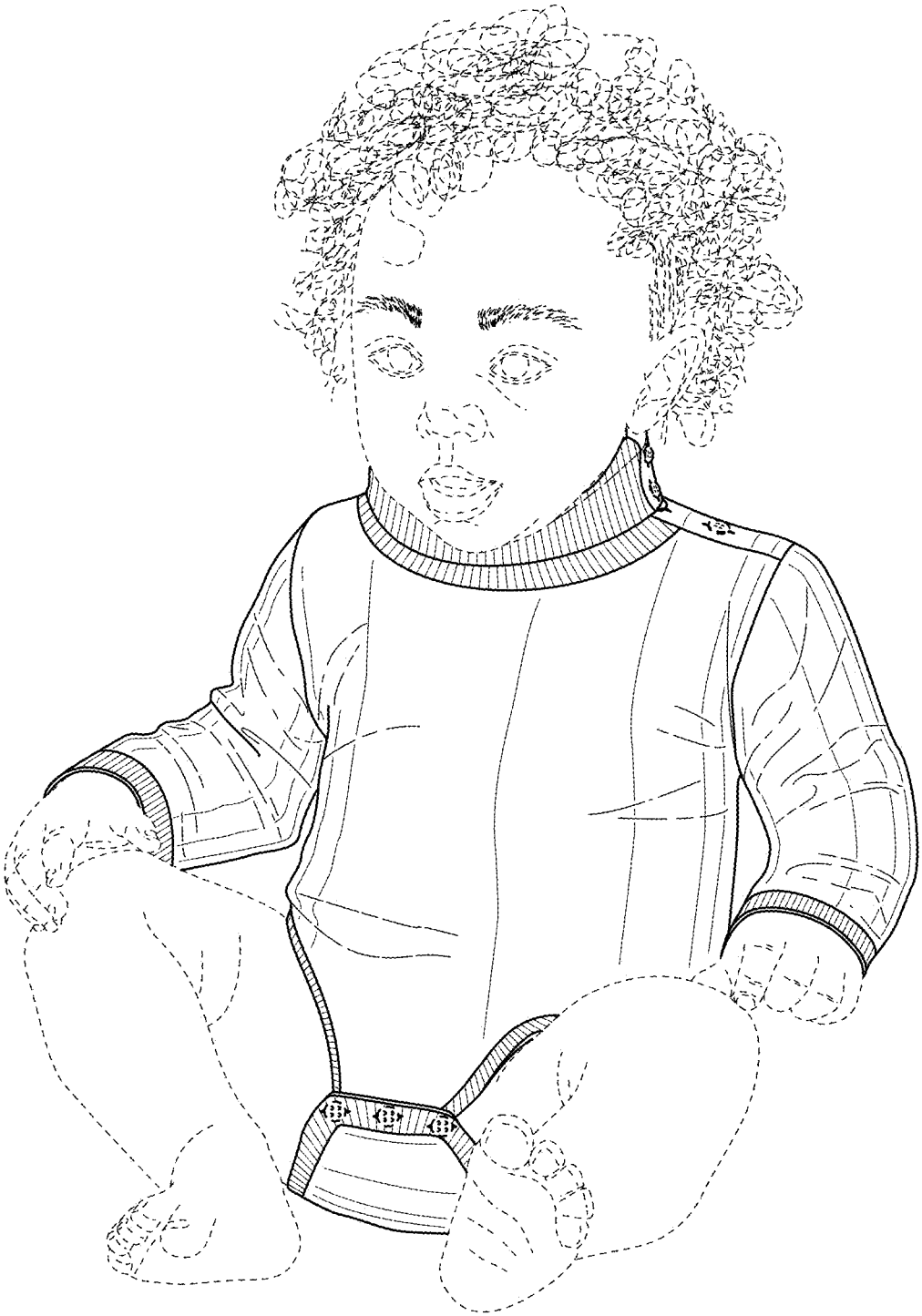
FIG. 1
(Amended)

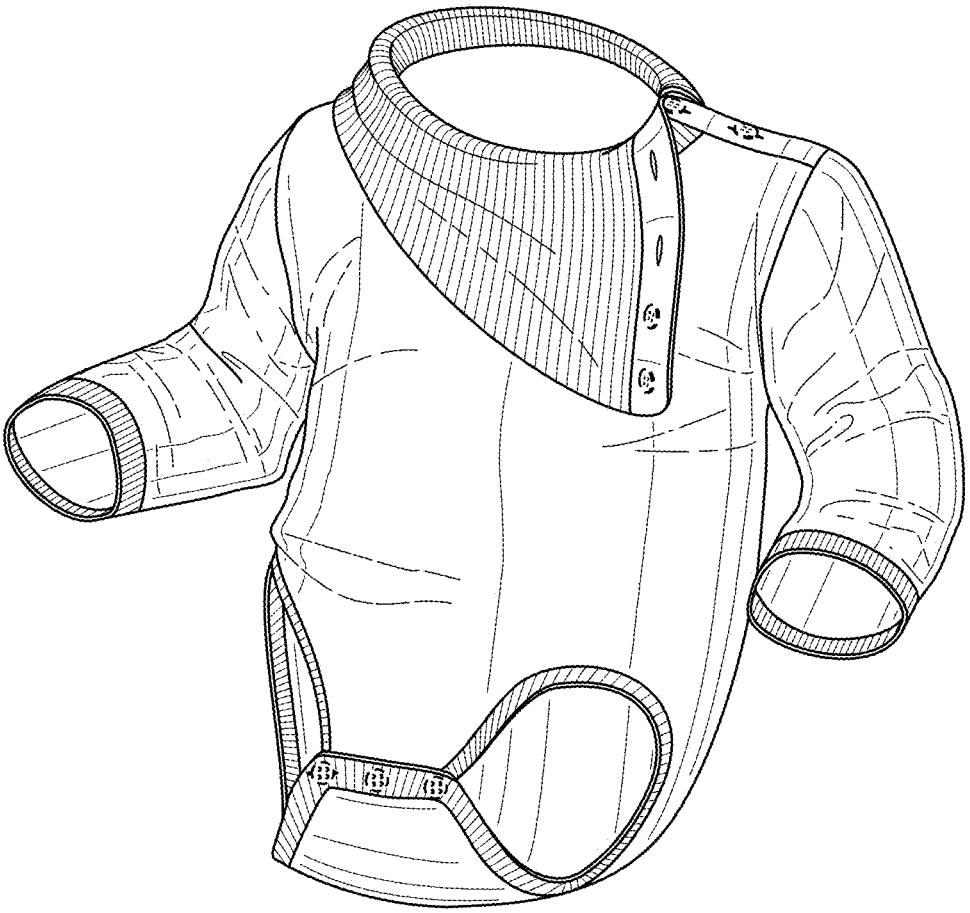
FIG. 2
(Amended)

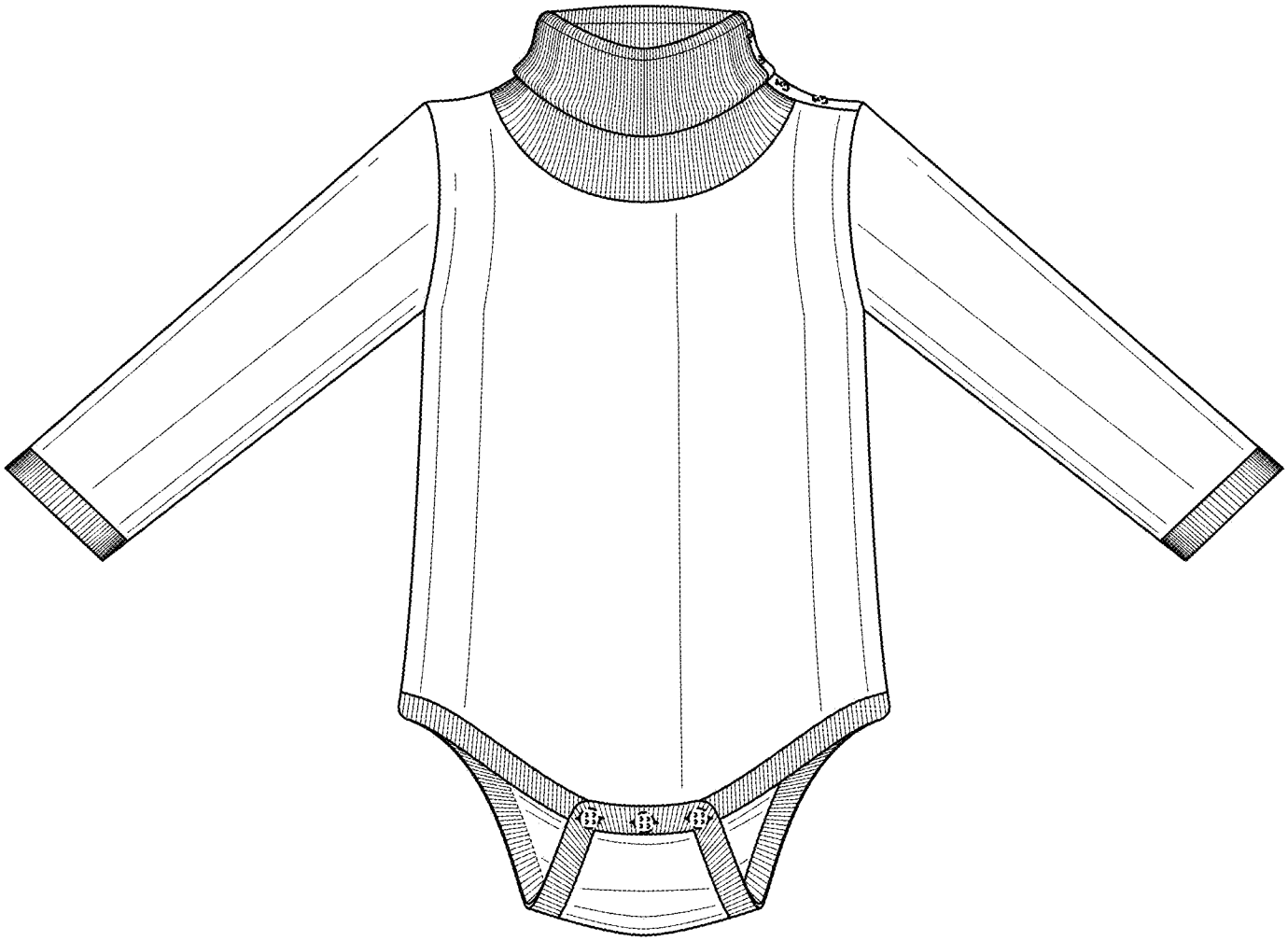
FIG. 3
(AMENDED)

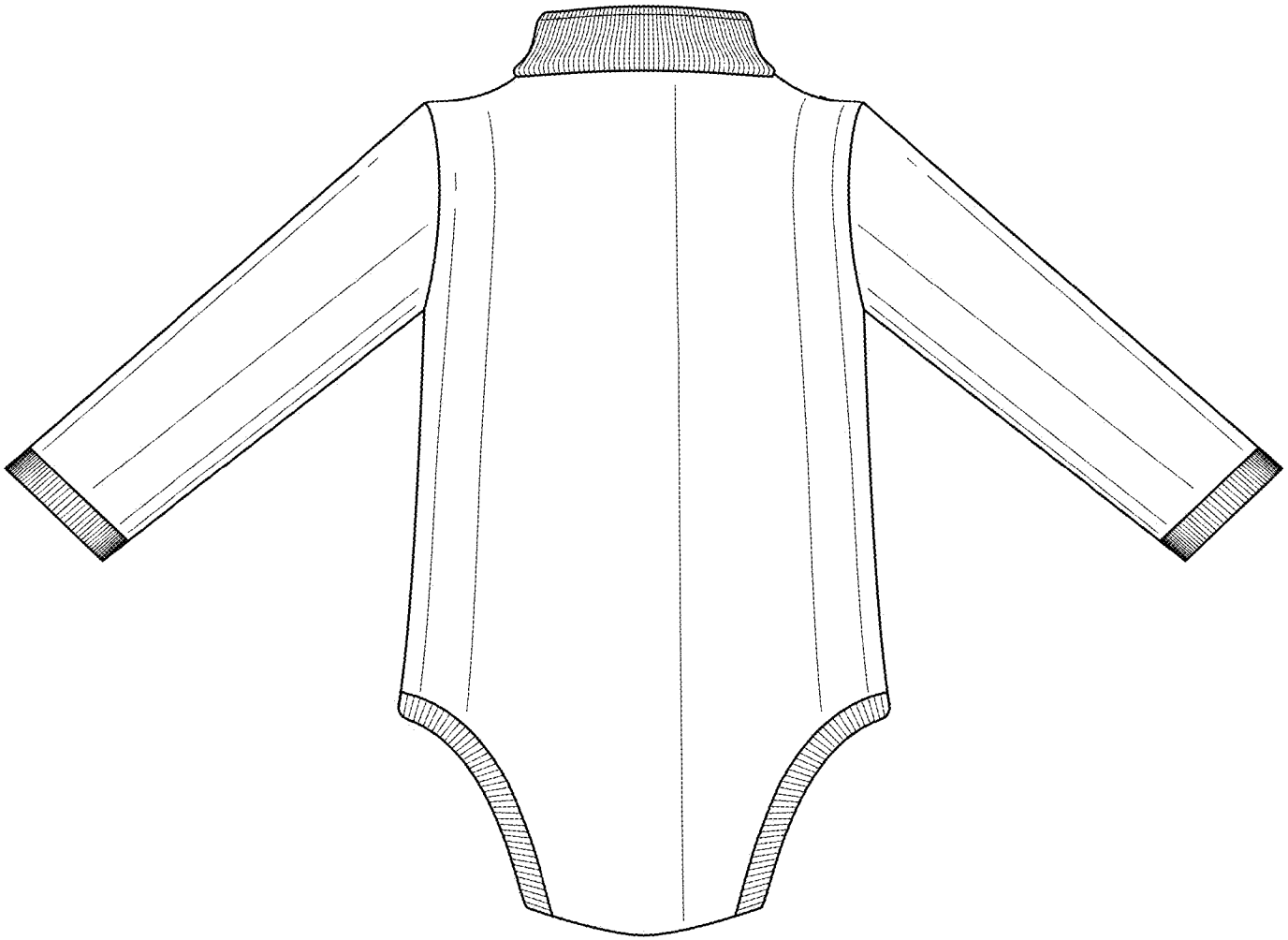
FIG. 4
(AMENDED)

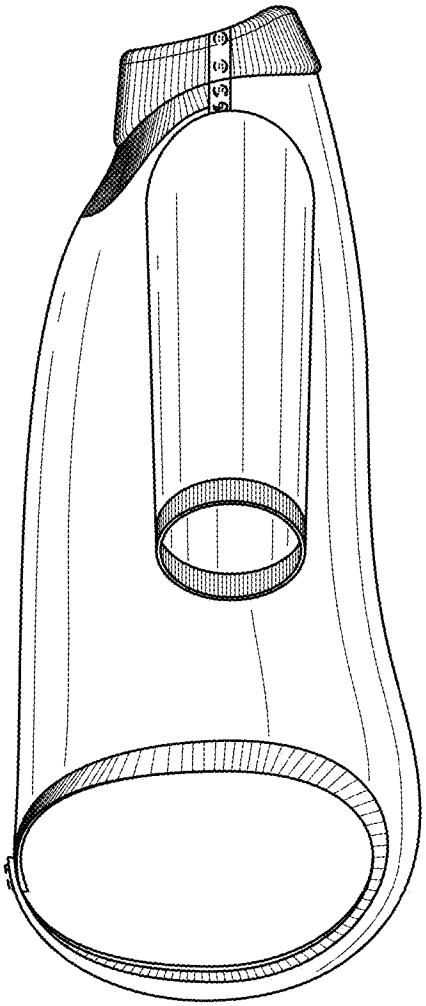
FIG. 6
(AMENDED)
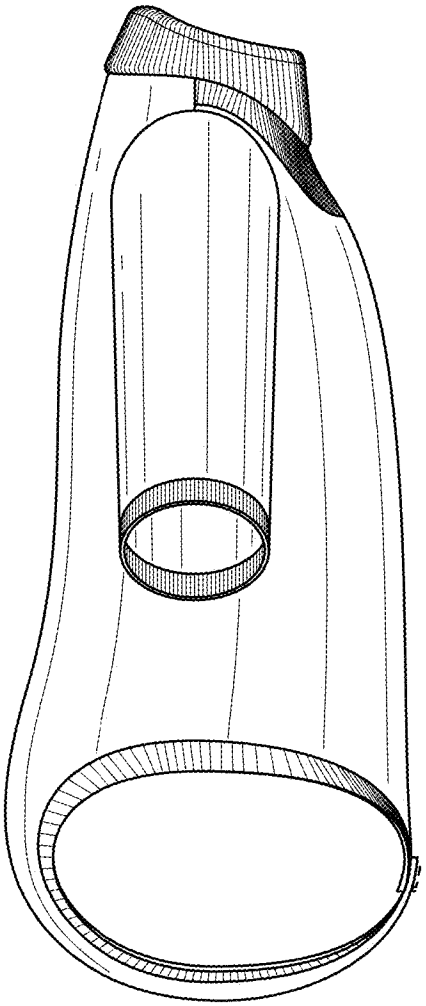
FIG. 5
(AMENDED)

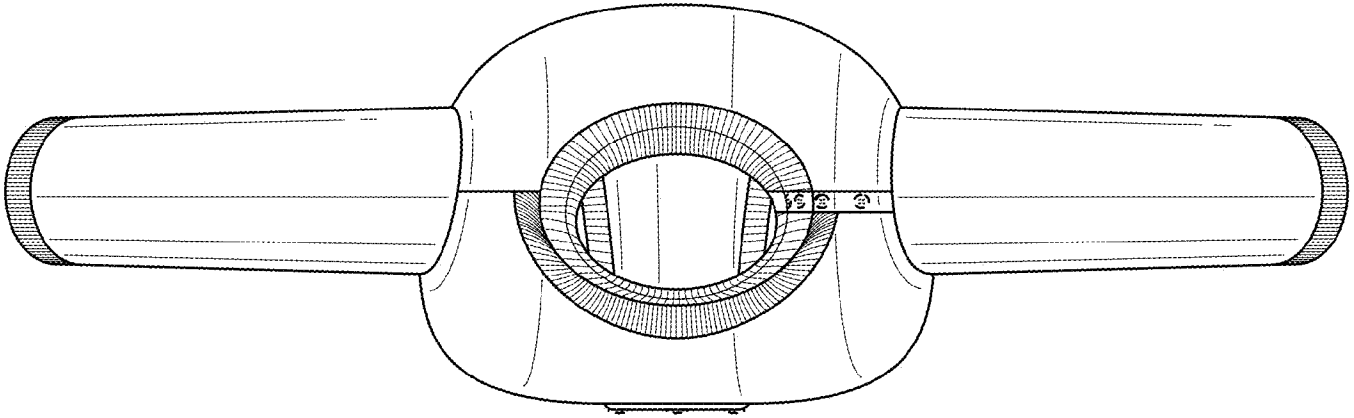
FIG. 7
(AMENDED)
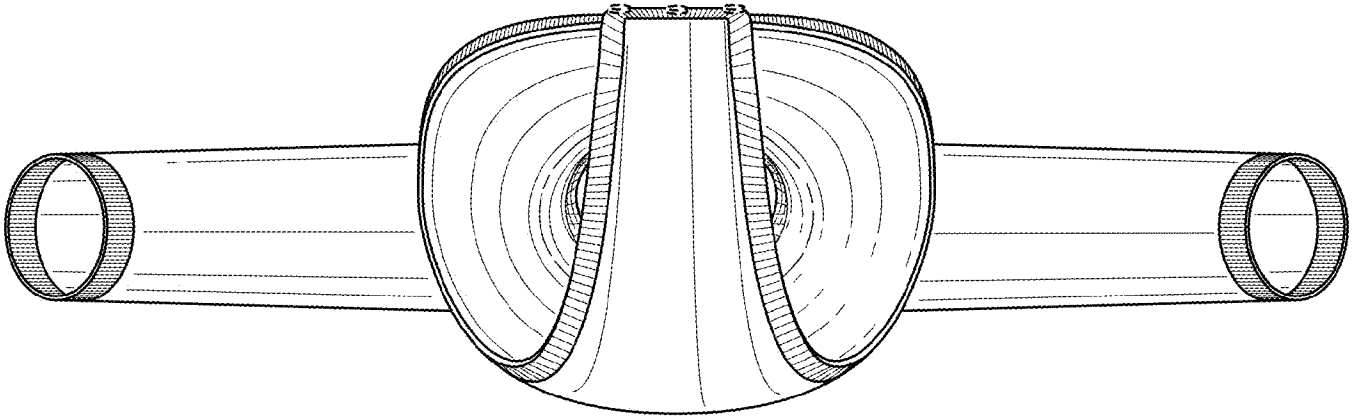
FIG. 8
(AMENDED)

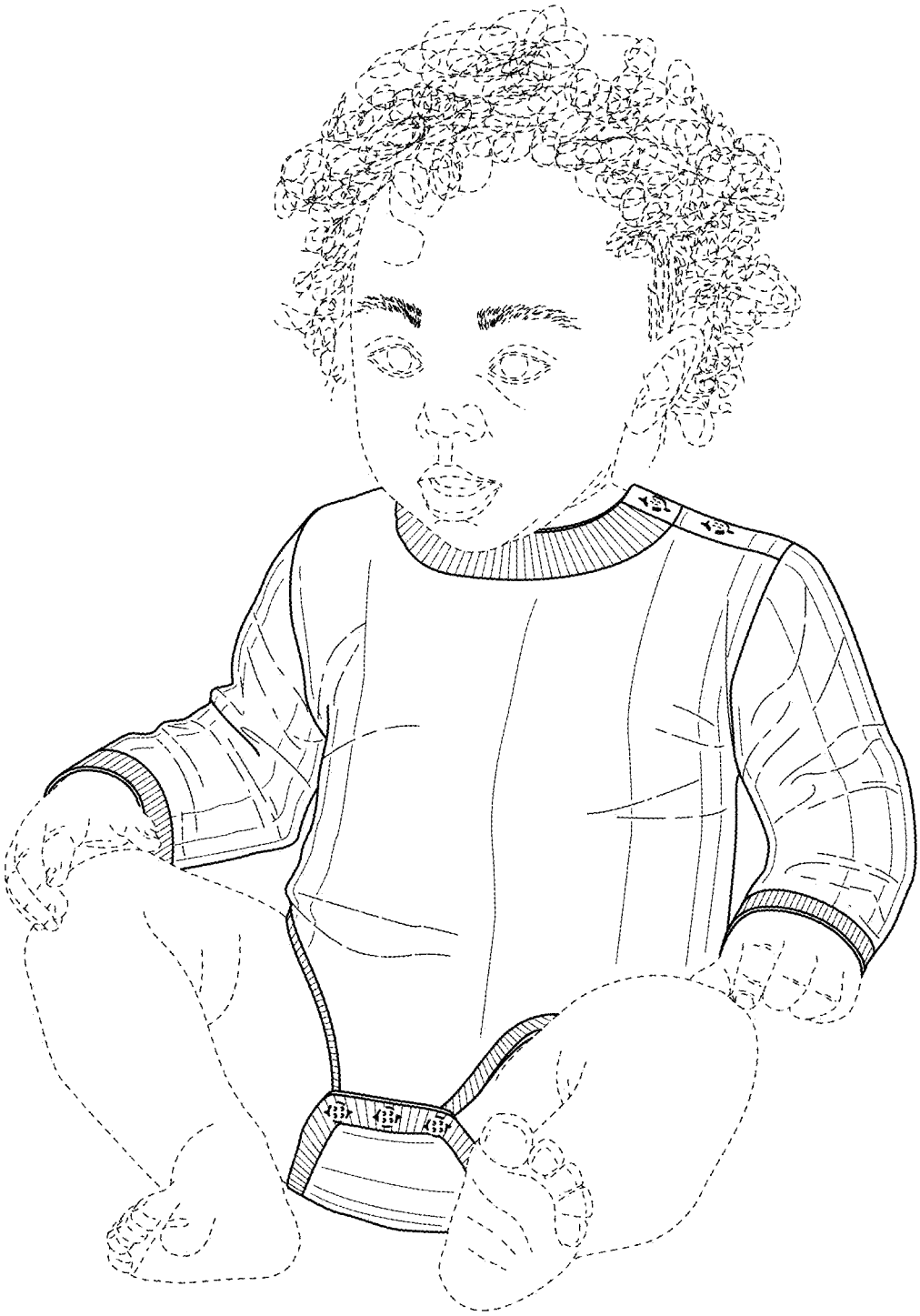
FIG. 9
(Amended)

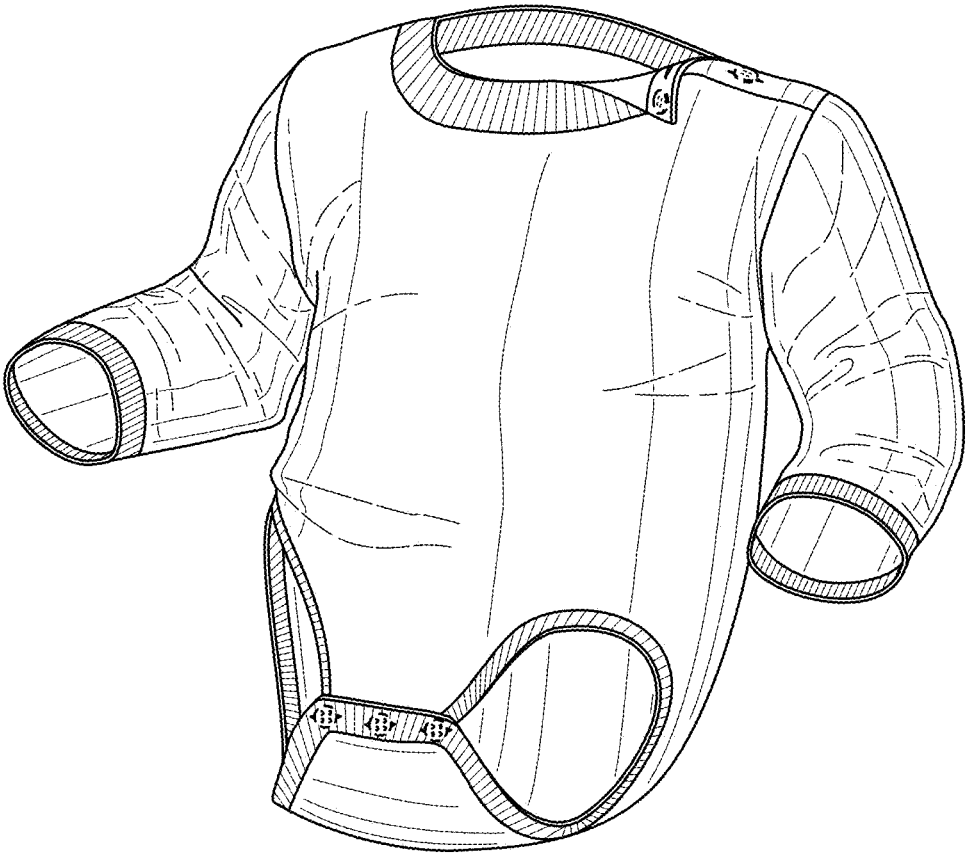
FIG. 10
(Amended)

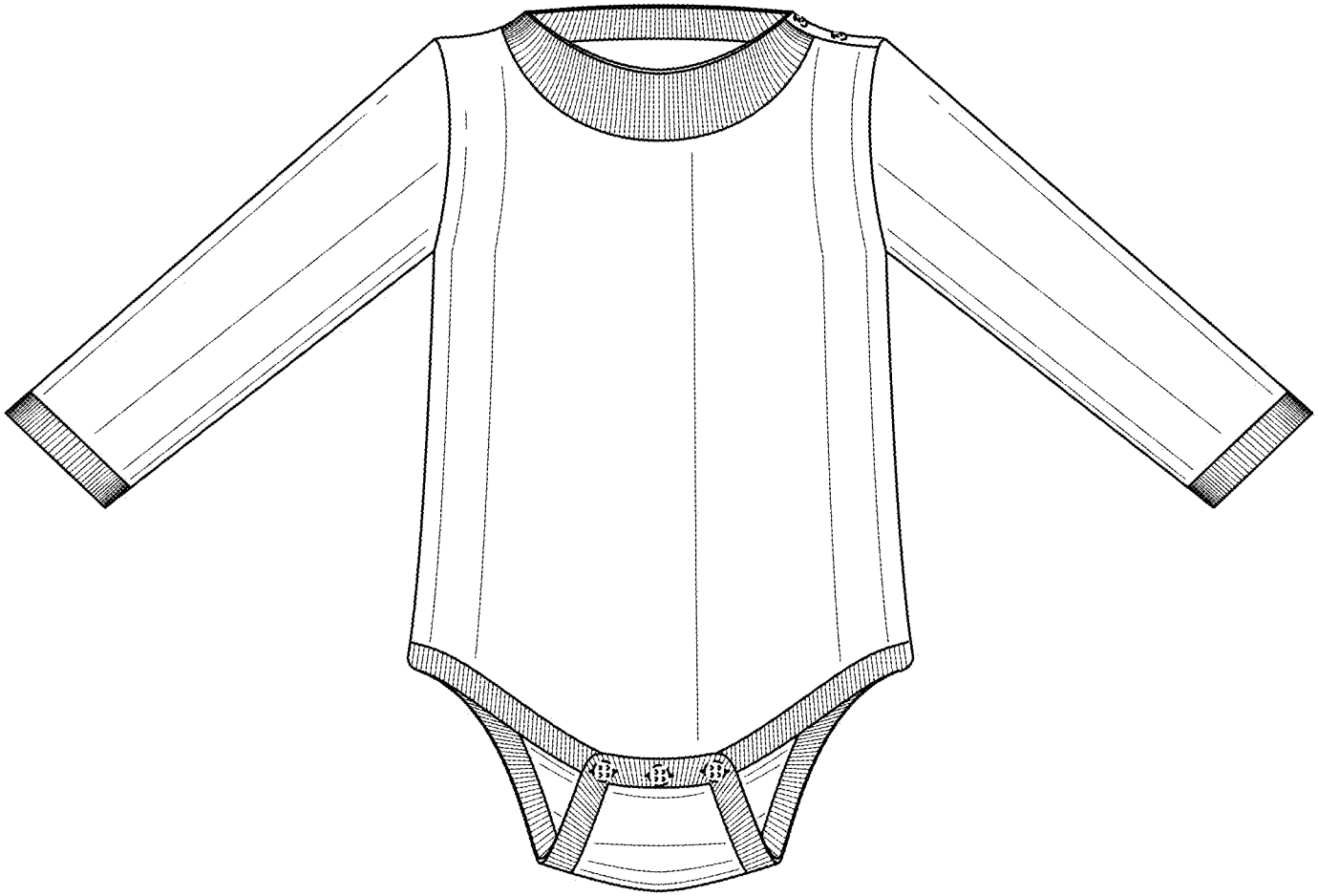
FIG. 11
(AMENDED)

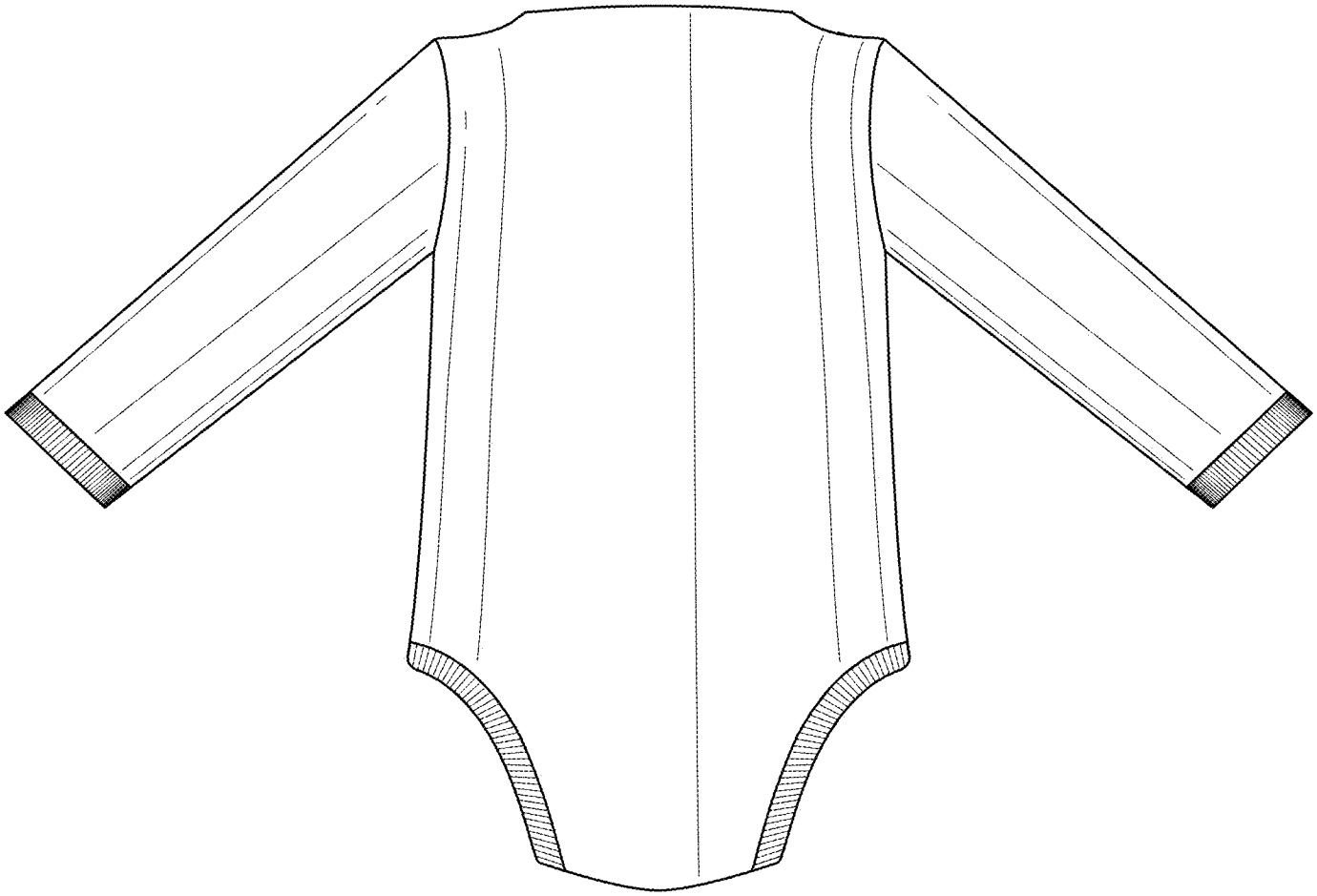
FIG. 12
(AMENDED)

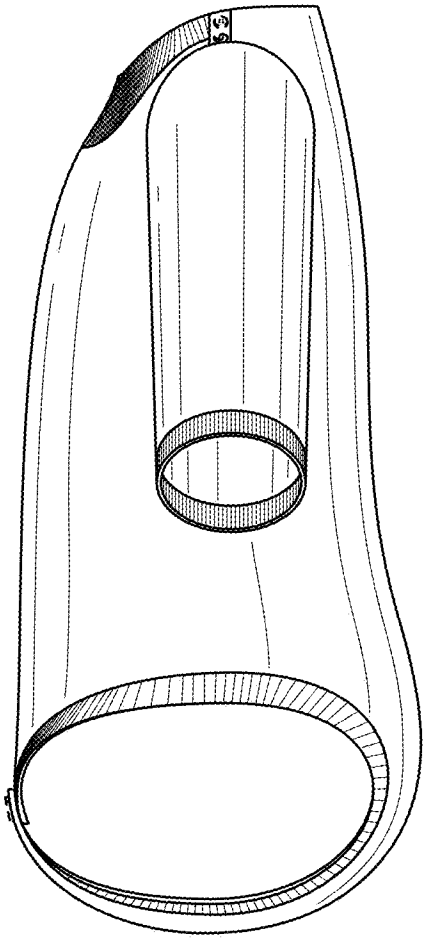
FIG. 14
(AMENDED)
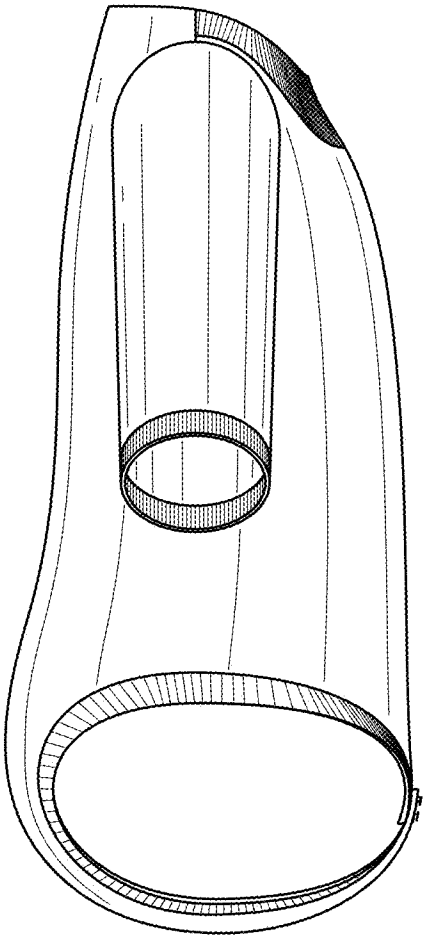
FIG. 13
(AMENDED)

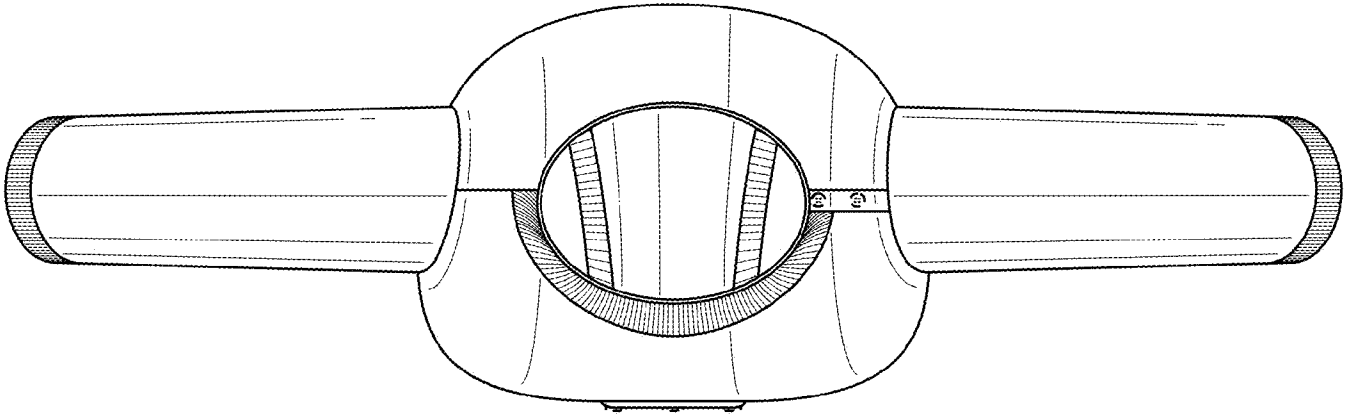
FIG. 15
(AMENDED)
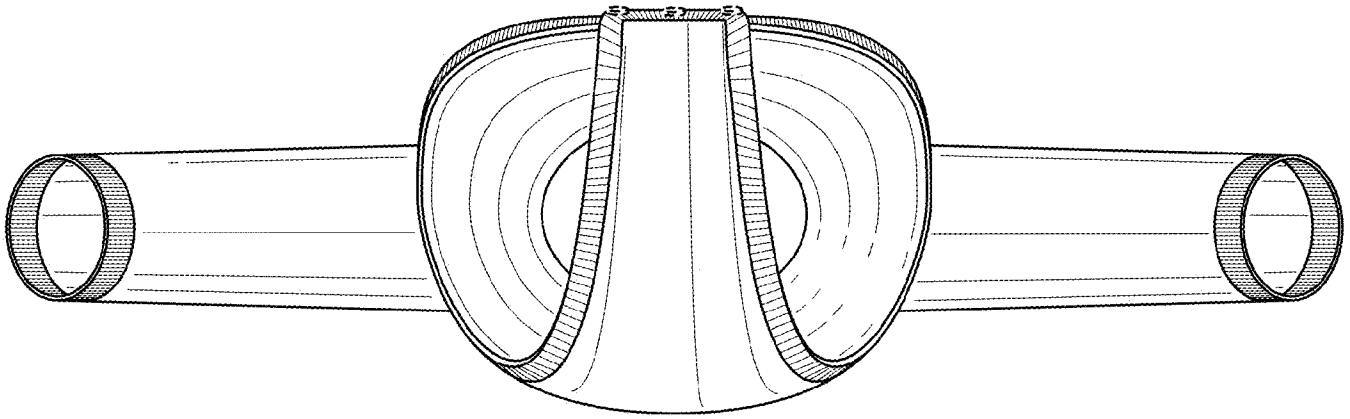
FIG. 16
(AMENDED)